US010817874B2

(12) United States Patent
Spies et al.

(10) Patent No.: US 10,817,874 B2
(45) Date of Patent: Oct. 27, 2020

(54) PURCHASE TRANSACTION SYSTEM WITH ENCRYPTED PAYMENT CARD DATA

(71) Applicant: MICRO FOCUS LLC, Santa Clara, CA (US)

(72) Inventors: Terence Spies, Mountain View, CA (US); Matthew J. Pauker, San Francisco, CA (US)

(73) Assignee: MICRO FOCUS LLC, Santa Clara, CA (US)

(*) Notice: Subject to any disclaimer, the term of this patent is extended or adjusted under 35 U.S.C. 154(b) by 2112 days.

(21) Appl. No.: 14/060,518

(22) Filed: Oct. 22, 2013

(65) Prior Publication Data
US 2014/0052642 A1 Feb. 20, 2014

Related U.S. Application Data

(63) Continuation of application No. 12/791,593, filed on Jun. 1, 2010, now Pat. No. 8,571,995.
(Continued)

(51) Int. Cl.
G06Q 20/38 (2012.01)
G07F 7/10 (2006.01)
(Continued)

(52) U.S. Cl.
CPC ......... *G06Q 20/3829* (2013.01); *G06Q 20/20* (2013.01); *G06Q 20/367* (2013.01);
(Continued)

(58) Field of Classification Search
CPC .. G06Q 20/023; G06Q 20/027; G06Q 20/383; G06Q 20/385; G06Q 20/0855;
(Continued)

(56) References Cited

U.S. PATENT DOCUMENTS 4,771,461 A 9/1988 Matyas
4,965,568 A 10/1990 Atalla
(Continued)

FOREIGN PATENT DOCUMENTS

EP 1265200 12/2002
WO 2006/107777 10/2006
(Continued)

OTHER PUBLICATIONS

Boneh et al. "Identity-Based Encryption from the Weil Pairing," from Crypto '2001 (Oct. 2002).
(Continued)

*Primary Examiner* — Steven S Kim

(57) ABSTRACT

Systems and methods are provided for securing payment card information. A user may present a payment card such as a credit card to point-of-sale equipment. The point-of-sale equipment may encrypt the payment card information. An encryption algorithm may be used that takes as inputs a first part of the payment card information, a tweak formed by a second part of the payment card information, and an encryption key. The encrypted payment card information may be conveyed to a gateway over a communications network. The gateway may identify which encryption algorithm was used in encrypting the payment card information and may re-encrypt the payment card information using a format preserving encryption algorithm. A network-based service may be used to remotely perform functions for the gateway.

17 Claims, 5 Drawing Sheets

Related U.S. Application Data

(60) Provisional application No. 61/183,530, filed on Jun. 2, 2009.

(51) Int. Cl.
  *G06Q 20/36* (2012.01)
  *G06Q 20/20* (2012.01)

(52) U.S. Cl.
  CPC ....... *G06Q 20/3823* (2013.01); *G07F 7/1016* (2013.01); *G07F 7/1091* (2013.01)

(58) Field of Classification Search
  CPC .............. G06Q 20/382; G06Q 20/3823; G06Q 20/3829
  See application file for complete search history.

(56) References Cited

U.S. PATENT DOCUMENTS

| | | | |
|---|---|---|---|
| 6,169,803 B1 | 1/2001 | Sako | |
| 6,240,513 B1 | 5/2001 | Friedman | |
| 6,324,525 B1 | 11/2001 | Kramer et al. | |
| 6,557,037 B1* | 4/2003 | Provino | H04L 29/06 709/225 |
| 6,886,096 B2 | 4/2005 | Appenzeller et al. | |
| 6,985,583 B1 | 1/2006 | Brainard | |
| 7,003,117 B2 | 2/2006 | Kacker et al. | |
| 7,113,594 B2 | 9/2006 | Boneh et al. | |
| 7,159,114 B1 | 1/2007 | Zajkowski et al. | |
| 7,370,202 B2 | 5/2008 | Appenzeller et al. | |
| 7,412,059 B1 | 8/2008 | Pauker et al. | |
| 7,424,614 B2 | 9/2008 | Appenzeller et al. | |
| 7,506,812 B2 | 3/2009 | von Mueller et al. | |
| 7,523,314 B2 | 4/2009 | Spies et al. | |
| 7,568,621 B2 | 8/2009 | von Mueller et al. | |
| 7,587,368 B2 | 9/2009 | Felsher | |
| 7,590,236 B1 | 9/2009 | Boneh | |
| 7,740,173 B2 | 6/2010 | von Mueller et al. | |
| 7,827,101 B2* | 11/2010 | Mascavage, III | G06Q 20/04 705/39 |
| 7,864,952 B2* | 1/2011 | Pauker | H04L 9/0625 380/28 |
| 7,891,563 B2* | 2/2011 | Oder, II | G06Q 20/20 235/383 |
| 8,397,988 B1* | 3/2013 | Zuili | G06Q 20/341 235/383 |
| 8,726,369 B1* | 5/2014 | Emigh | H04L 63/123 713/182 |
| 2002/0112154 A1 | 8/2002 | Wallace | |
| 2004/0008846 A1 | 1/2004 | Medvinsky | |
| 2004/0044739 A1 | 3/2004 | Ziegler | |
| 2004/0123125 A1* | 6/2004 | Zuili | H04N 7/163 713/193 |
| 2004/0136533 A1* | 7/2004 | Takagaki | H04L 9/0891 380/255 |
| 2004/0151308 A1* | 8/2004 | Kacker | H04L 63/0442 380/30 |
| 2004/0181463 A1 | 9/2004 | Goldwaite | |
| 2005/0152538 A1* | 7/2005 | Stedron | G09C 1/02 380/28 |
| 2005/0204128 A1 | 9/2005 | Aday | |
| 2006/0010324 A1 | 1/2006 | Appenzeller et al. | |
| 2006/0049256 A1 | 3/2006 | von Mueller et al. | |
| 2006/0149683 A1 | 7/2006 | Shimojima | |
| 2006/0229991 A1 | 10/2006 | Campagna | |
| 2007/0041583 A1 | 2/2007 | Boneh | |
| 2007/0276765 A1 | 11/2007 | Hazel | |
| 2007/0277013 A1 | 11/2007 | Rexha et al. | |
| 2008/0040603 A1* | 2/2008 | Stedron | H04L 9/088 713/166 |
| 2008/0103982 A1 | 5/2008 | Hammad et al. | |
| 2009/0144202 A1 | 6/2009 | Hurry | |
| 2009/0202081 A1 | 8/2009 | Hammad | |
| 2009/0310778 A1 | 12/2009 | Mueller | |
| 2010/0211507 A1 | 8/2010 | Aabye | |
| 2010/0217674 A1* | 8/2010 | Kean | G06Q 20/204 705/17 |
| 2010/0290627 A1 | 11/2010 | Tsuji et al. | |
| 2010/0293099 A1 | 11/2010 | Pauker | |
| 2010/0318468 A1 | 12/2010 | Carr et al. | |
| 2011/0137802 A1 | 6/2011 | Spies | |

FOREIGN PATENT DOCUMENTS

| | | |
|---|---|---|
| WO | WO-2008021581 | 2/2008 |
| WO | 2010141501 | 12/2010 |

OTHER PUBLICATIONS

Pauker, Matthew J. et al. U.S. Appl. No. 12/467,188, filed May 15, 2009.

Schneir, Bruce, "Applied Cryptography, Second Edition", John Wiley * Sons, Inc. 1996, pp. 1-56.

European Patent Office, Annex to the Communication for Appl. No. 10725324.7 dated Aug. 15, 2014 (4 pages).

European Patent Office, Annex to the Communication for Appl. No. 10725324.7 dated Mar. 17, 2017 (6 pages).

European Patent Office, Decision to refuse a European Patent Application for Appl. No. 10725324.7 dated Dec. 11, 2017 (14 pages).

European Patent Office, International Search Report for PCT/US2010/036948 dated Feb. 3, 2011 (5 pages).

European Patent Office, Written Opinion of the International Searching Authority for PCT/US2010/036948 dated Feb. 3, 2011 (9 pages).

* cited by examiner

PURCHASE TRANSACTION SYSTEM WITH ENCRYPTED PAYMENT CARD DATA

This application is a continuation of patent application Ser. No. 12/791,593, filed Jun. 1, 2010, which claims the benefit of provisional patent application No. 61/183,530, filed Jun. 2, 2009, which are hereby incorporated by reference herein in their entireties.

BACKGROUND OF THE INVENTION

This invention relates to purchase transaction systems that use payment card information and, more particularly, to systems in which cryptographic techniques are used to secure sensitive payment card information.

In modern financial systems, purchase transaction information often contains sensitive data. For example, when a customer makes a purchase at a store with a payment card such as a credit card or debit card, point-of-sale equipment in the store is used to acquire payment card data from the customer's card. The payment card information may be stored in tracks on a magnetic stripe on the card. The customer may swipe the magnetic stripe portion of the card through a card reader to make a purchase. The point-of-sale equipment conveys the track information that is acquired in this way to the computer systems of a purchase transaction processor. The purchase transaction processor may then process the transaction. For example, the purchase transaction processor may check the customer's account balance and other information to determine whether the customer is authorized to make a purchase and may debit the customer's account accordingly.

Track information on payment cards may include account number information, cardholder names, expiration data information, security codes, personal identification number (PIN) data, and other sensitive financial and personal data.

If care is not taken to secure sensitive payment card data, it is possible that an attacker may obtain unauthorized access to the payment card data. For example, a hacker might be able to install unauthorized eavesdropping software that monitors payment card data between the point at which the payment card data is first read off of a customer's payment card and the point at which the payment card data is successfully received at the purchase transaction processor.

The inadvertent disclosure of payment card data can result in the need to reissue cards and alert a potentially large number of affected customers. These responses to a successful attack may be exceedingly inconvenient and costly.

It would therefore be desirable to be able to provide improved techniques for securing sensitive payment card information in payment card data processing systems.

SUMMARY OF THE INVENTION

Systems and methods are provided for securing payment card information. A user may present a payment card such as a credit card to point-of-sale equipment. The point-of-sale equipment may encrypt the payment card information. An encryption algorithm may be used that takes as inputs a first part of the payment card information, a tweak formed by a second part of the payment card information, and an encryption key. The encrypted payment card information may be conveyed to a gateway over a communications network. The gateway may identify which encryption algorithm was used in encrypting the payment card information and may re-encrypt the payment card information using a format preserving encryption algorithm. A network-based service may be used to remotely perform functions for the gateway.

Further features of the invention, its nature and various advantages will be more apparent from the accompanying drawings and the following detailed description of the preferred embodiments.

DETAILED DESCRIPTION

Figure 1:
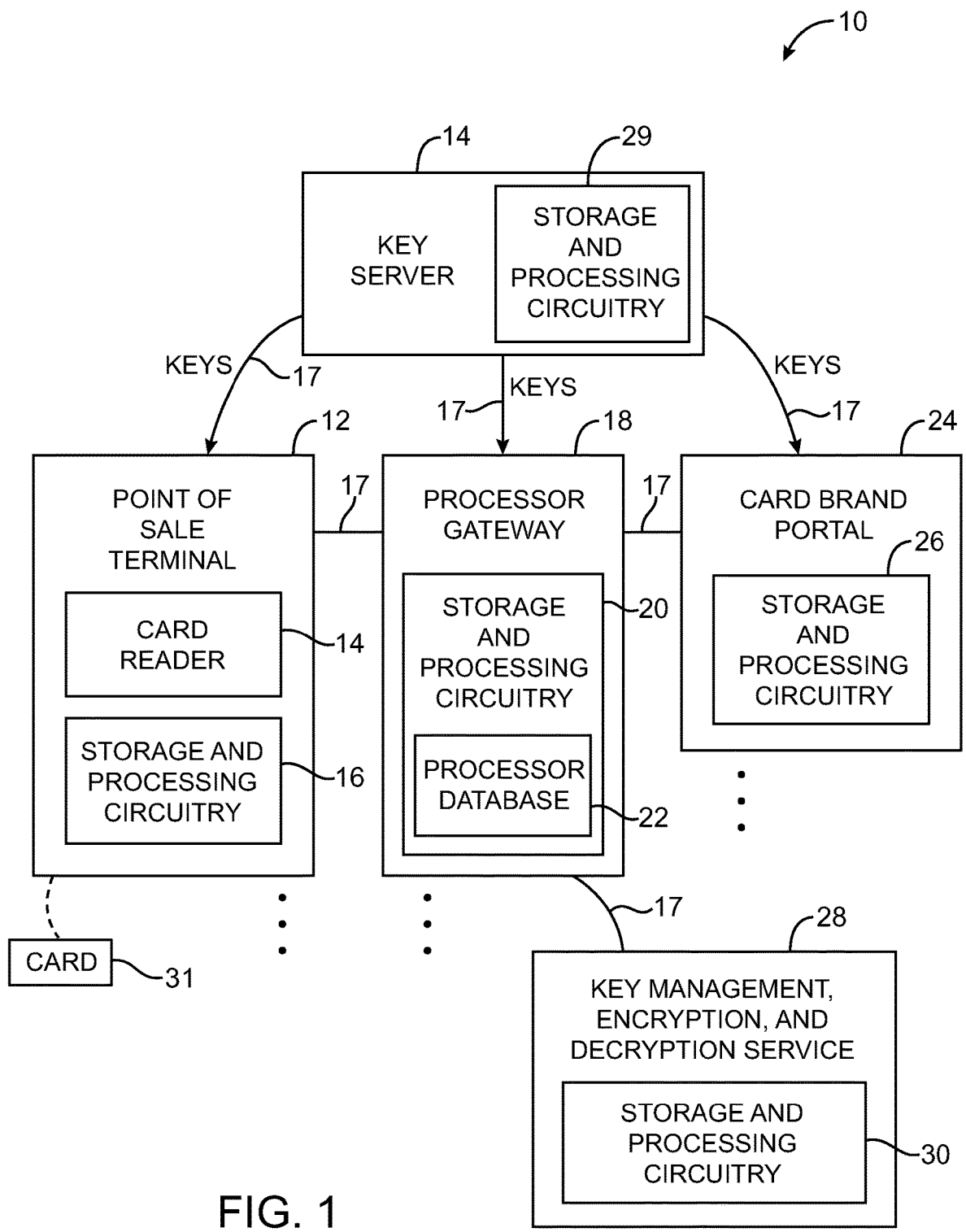
FIG. 1 is a diagram of an illustrative system in which payment card information may be conveyed securely between point of sale terminals, payment processor gateways, and card brand portals in accordance with an embodiment of the present invention.

Payment card data such as data from credit cards and debit cards can contain sensitive information such as cardholder names, account number information (e.g., primary account numbers or PANs), expiration dates, personal identification numbers, etc.

Payment card data is typically collected from a user's payment card as part of a purchase transaction. For example, a card reader may gather payment card information from magnetic stripes on the payment card or personnel at a point of sale terminal may manually enter payment card information.

Payment card data may be sent from point of sale terminals to processor gateways that perform functions such as transaction authentication and transaction clearance. Gateways may send payment card data to a card brand portal or other equipment associated with a credit card company and its affiliates for additional processing.

Cryptographic techniques may be used to ensure that payment card data is not inadvertently revealed to unauthorized parties. These techniques may be based on symmetric key cryptography and/or public key cryptography such as identity-based encryption (IBE) public key algorithms.

With symmetric key cryptographic arrangements, the encrypter of a data item (sometimes called a sender) uses the same key to encrypt the data item that the decrypter of the data item (sometimes referred to as a recipient) uses to decrypt the data item. Symmetric key systems require that each sender and receiver exchange a shared key in a secure manner.

With public key cryptographic systems, two types of keys are used—public keys and private keys. Senders may encrypt messages using the public keys of recipients. Each recipient has a private key that is used to decrypt the messages for that recipient.

To ensure the authenticity of the public keys in traditional public key systems and thereby defeat possible man-in-themiddle attacks, public keys may be provided to senders with a certificate signed by a trusted certificate authority. The certificate may be used to verify that the public key belongs to the intended recipient of the sender's message. Public key encryption systems that use this type of traditional approach are said to use the public key infrastructure (PKI) and are referred to as PKI cryptographic systems.

Identity-based-encryption (IBE) public key cryptographic systems have also been proposed. An example of an IBE scheme that has been successfully implemented in the context of encrypted email messages is the so-called Boneh-Franklin scheme (see, for example, Dan Boneh and Matthew K. Franklin, "Identity-Based Encryption from the Weil Pairing" in Advances in Cryptology—Proceedings of CRYPTO 2001).

As with PKI cryptographic systems, a sender in an IBE system may encrypt a message for a given recipient using the recipient's public key. The recipient may then decrypt the message using the recipient's corresponding private key. The recipient can obtain the private key from an IBE private key generator.

Unlike PKI schemes, IBE schemes generally do not require the sender to look up the recipient's public key. Rather, a sender in an IBE system may generate a given recipient's IBE public key based on known rules. For example, a message recipient's email address or other identity-based information may be used as the recipient's public key, so that a sender may create the IBE public key of a recipient by simply determining the recipient's email address.

During the IBE encryption process, an IBE encryption engine encrypts plaintext to produce ciphertext. The IBE encryption engine takes the IBE public key of the recipient and the plaintext as inputs. The IBE encryption engine also uses so-called IBE public parameter information (the parameters P and sP in the Boneh-Franklin IBE scheme) as an input. The output of the IBE encryption engine is the ciphertext (i.e., the IBE-encrypted version of the plaintext input).

In accordance with aspects of the present invention, symmetric key cryptographic techniques and/or public key cryptographic key techniques such as PKI and/or IBE public key cryptographic techniques may be used in securing payment card information.

A typical system environment in which payment card information may be secured in this way is shown in FIG. 1. The entities of system 10 may have computing equipment with which cryptographic functions such as encryption and decryption may be performed. This computing equipment, which is depicted as storage and processing circuitry 16, 20, 29, 26, and 30 in FIG. 1, may be electrically linked through a communications network. The communications network may include networks such as the internet, the public switched telephone network, local area networks, wide area networks, etc. Encrypted information may be conveyed over the network using suitable communications protocols such as by transmitting one or more bits, by transmitting one or more packets, by transmitting email messages, SMS (short message system) messages, or other larger data items, or by transmitting any other suitable data structures.

Storage and processing circuitry 16, 20, 29, 26, and 30 may be used to run software. The software may include code that, when installed and run on the hardware of system 10, configures the system to perform cryptographic functions and other data processing operations.

A user in system 10 may have a payment card such as a debit card or credit card. Scenarios in which the user has a credit card are sometimes described herein as an example. Payment cards such as payment card 31 in FIG. 1 typically contain magnetic stripes or a storage element based on an integrated circuit. The magnetic stripe or other storage structure on card 31 may contain credit card information such as user account name information, account number information (e.g., primary account number or PAN information), personal identification number (PIN) information, security code information, etc. This information may be stored in the form of tracks on the magnetic stripe or may be stored in a circuit that is associated with the card (e.g., when the payment card is a so-called "smart card").

When a user makes a purchase, the user (or personnel associated with a merchant) swipes credit card 31 through credit card reader 14 in point-of-sale equipment 16. The credit card reader contains a magnetic head that extracts the credit card information from the magnetic strip on credit card 31. If the swipe is effective, the magnetic stripe track information that is obtained from the card may be used to complete the user's purchase transaction. If the swipe is not effective, personnel at point-of-sale terminal 12 may manually enter the credit card number and possibly their credit card information using keys on a keypad in point-of-sale equipment 12.

In contactless systems, radio-frequency transceiver circuitry in the payment card and point of sale terminal may communicate wirelessly. This allows payment card data to be gathered without running the card through a magnetic stripe reader. Another type of arrangement that may be used by point of sale terminal 12 involves the use of so-called smart cards. This type of payment card includes circuitry (i.e., one or more integrated circuits) that may electronically store payment card information. Using a "chip and PIN" (smartcard) reader, payment card information may be gathered from this type of payment card.

In general, card reader 14 may include manual entry equipment (e.g., a keypad), wireless payment card information gathering equipment (e.g., a radio-frequency transceiver), magnetic stripe read head equipment, or smartcard reader equipment. The use of magnetic stripe card reading equipment for card reader 14 is sometimes described herein as an example, but this is merely illustrative. Card reader 14 may be implemented using any suitable equipment.

Most or all of the credit card information obtained from the credit card is not initially encrypted. As a result, the transmission of this information from point-of-sale terminal 12 to equipment such as the other equipment in FIG. 1 in unencrypted form presents a potential avenue for attack by an attacker.

To prevent unauthorized access to the credit card information, point-of-sale equipment 12 may be provided with an encryption engine. Code for the encryption engine may be implemented on computing equipment such as storage and processing circuitry 16. The encryption engine may encrypt sensitive information such as payment card information before this information is transmitted to purchase transaction processing gateway 18.

As shown in FIG. 1, gateway 18 may have computing equipment such as storage and processing circuitry 20. Gateway 18 may be associated with an entity that serves as an intermediary that aggregates payment card transactions from multiple point-of-sale terminals for subsequent processing by a payment card company at card brand portal 24 or other equipment associated with a payment card.

There are typically numerous point of sale terminals 12, numerous gateways 18, and a number of different card brand portals 24 in system 10. For example, multiple point of sale terminals are generally used to send payment card information to a common gateway. This gateway may, in turn, send payment card information to multiple portals 24. Each portal 24 may, for example, be associated with a different brand of credit card.

Typical functions that may be implemented by gateway 18 involve authorization (e.g., determining whether a payment card that a user has presented at point-of-sale equipment 12 is valid and has available credit) and clearance (e.g., finalizing a batch of purchase transactions by interacting with appropriate payment card companies). Although a typical financial system involves multiple parties that perform different aggregation, authorization, and clearance functions, these parties are represented by gateway 18 and card brand portal 24 in FIG. 1 as an example.

As with point-of-sale equipment 12 and purchase transaction processor 18, equipment in system 10 such as key server 14, card brand portal 24, and network service 28 may be implemented using computing equipment. The computing equipment used by the entities of system 10 may include personal computers, portable computers, workstations, mainframe computers, networked computers or terminals such as computer terminals that are connected to the Internet using a host computer in a local area network, handheld computers, embedded processors in gas pumps, cash registers, and other point-of-sale equipment, or any other suitable electronic equipment. This equipment is illustrated as storage and processing circuitry 29, 16, 20, 26, and 30 in FIG. 1.

The equipment of FIG. 1 may be interconnected by communications paths in a communications network. The communications network (shown as lines 17 in FIG. 1) may include the Internet and other wide area networks, one or more local area networks, switched telephone networks, networks such as virtual private networks, networks including dedicated leased lines, networks based on wired or wireless paths, or any other networks formed using any other suitable network technology.

When point-of-sale equipment 12 receives payment card information from the user of card 31, this payment card information may be encrypted by an encryption engine on terminal 12. The plaintext version of the payment card information and an encryption key may be used as inputs to the encryption engine. The encryption key may be a public key or a symmetric key. The resulting output of the encryption engine is ciphertext (i.e., the encryption-key-encrypted payment card information).

At gateway 18, storage and processing circuitry 20 may use a corresponding decryption key to decrypt the ciphertext. The resulting decrypted payment card information may, if desired, be re-encrypted. Data items such as ciphertext items, plaintext items, and re-encrypted data items may be stored in database 22. Database 22 may also be used to store ancillary information (e.g., other business information related to maintaining a record of purchase transactions, etc.). When desired, gateway 18 may convey payment card information and other data to card brand portal 24. Card brand portal 24 may be associated with a credit card company or other suitable entity (e.g., card issuing banks, agents of credit card companies or banks, etc.).

System 10 typically includes numerous point-of-sale terminals 12. System 10 may also include numerous purchase transaction processors 18 and numerous card brand portals. There may also be one or more network-based services such as service 28 in system 10. Service 28 may be an on-line service that is used by processor gateway 18 to implement cryptographic functions on behalf of gateway 18. For example, if gateway 18 does not include a decryption engine, service 28 may be used to implement a decryption engine. Gateway 18 may then convey ciphertext to service 28 so that service 28 may remotely perform decryption operations. Other examples of services that may be implemented by network service 28 include encryption operations, key management operations, etc.

Key server 14 may be used to generate cryptographic keys (e.g., symmetric keys, public keys, private keys, IBE private keys, master keys, intermediate keys, etc.).

Figure 2:
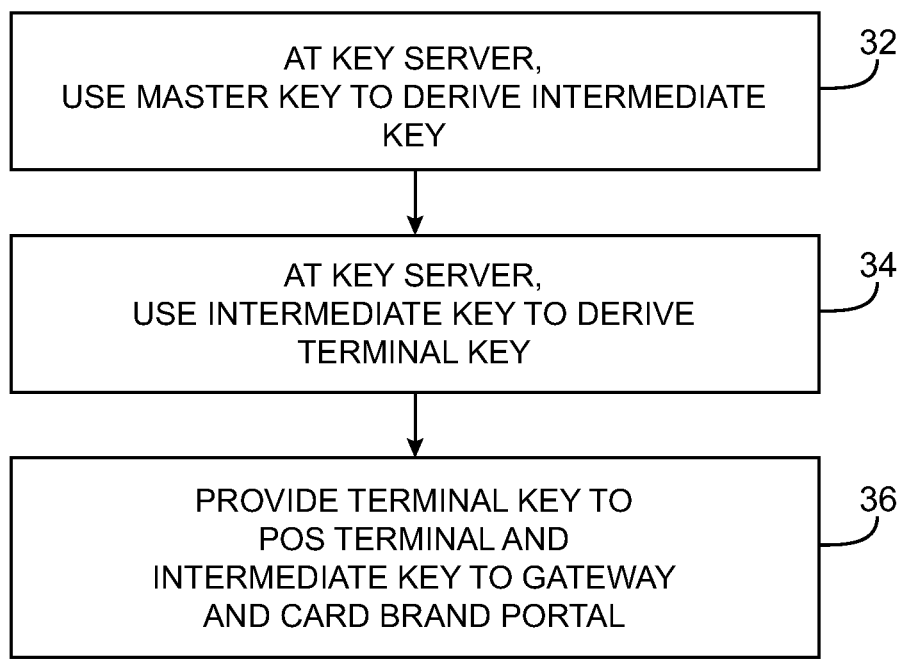
FIG. 2 is a flow chart of illustrative steps involved in performing key setup operations in accordance with an embodiment of the present invention.

Illustrative operations involved in using key server 14 to generate keys as part of a set-up process for system 10 are shown in FIG. 2.

Key server 14 may maintain a master secret (master key) in storage and processing circuitry 29. At step 32, key server 14 may use the master key to derive an intermediate key.

At step 34, key server 14 may use the intermediate key to derive a terminal key for a given point of sale terminal.

At step 36, the terminal key that was generated at step 34 may be conveyed from the key server 14 to the point of sale terminal 12. The intermediate key may be conveyed from key server 14 to gateway 18 (and, if desired, card brand portal 24).

Key information may be conveyed using any suitable technique. For example, keys can be encrypted at key server 14 and decrypted by the receiving entity. Keys may also be delivered in other secure ways (e.g., using fax, via telephone, in-person delivery, etc.). Secure communications links (e.g., SSL links) may also be used to distribute the keys generated by key server 14 if desired.

Once point of sale terminal 12 receives a terminal key from key server 14, point of sale terminal 12 may use the terminal key in encrypting sensitive information such as payment card information. The encrypted payment card information may then be conveyed to gateway 18. The intermediate keys that are delivered to equipment such as gateway 18 may be used in deriving a copy of a terminal key to use in decrypting the encrypted payment card information.

Figure 3:
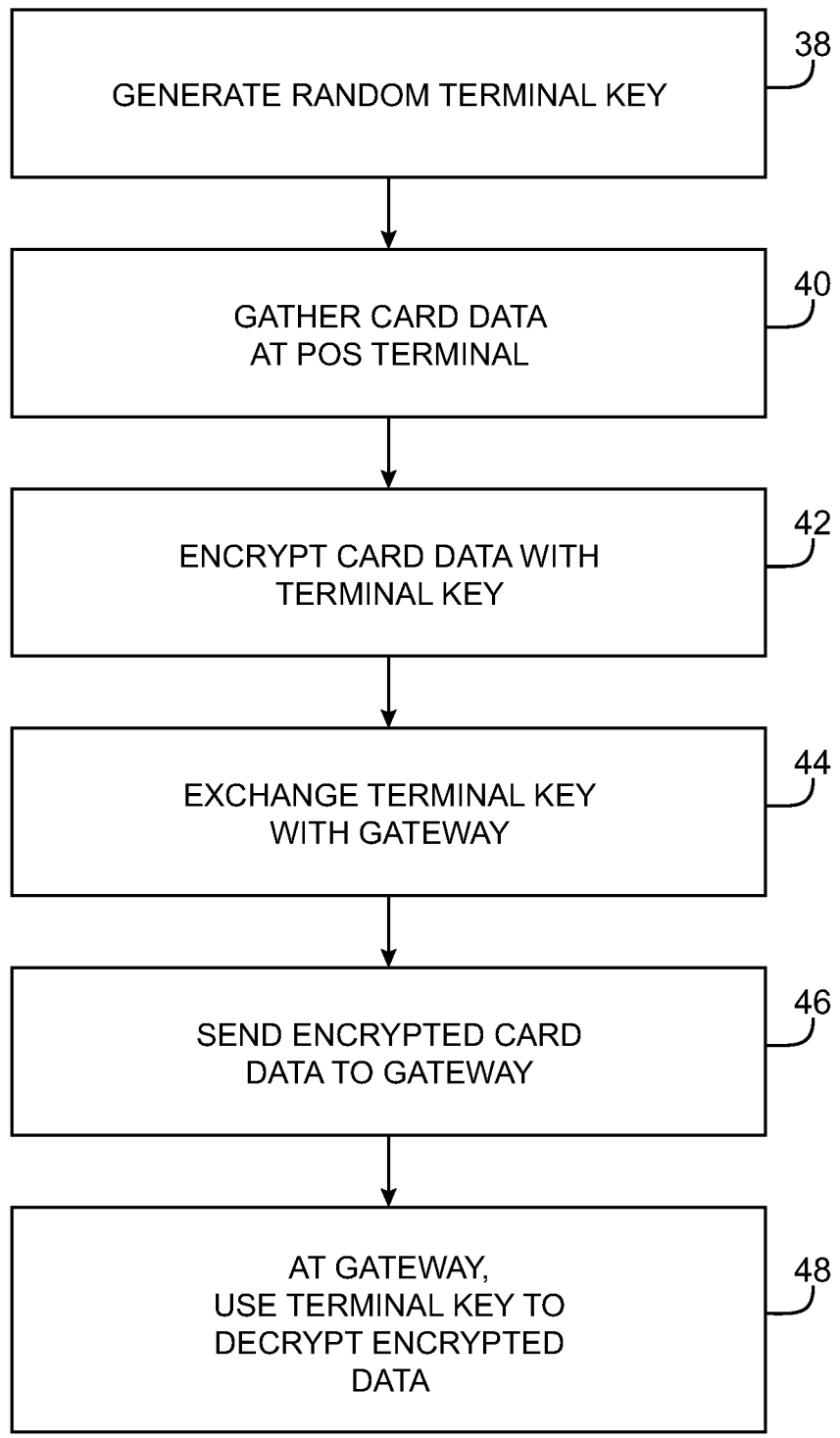
FIG. 3 is a flow chart of illustrative steps involved in using cryptographic operations to securely convey data within a system of the type shown in FIG. 1 in accordance with an embodiment of the present invention.

Illustrative steps involved in using cryptographic keys in securing payment card information in system 10 are shown in FIG. 3.

At step 38, a random terminal key may be generated to use as an encryption key. The terminal key may be generated by key server 14 and delivered securely to point of sale terminal 12 or point of sale terminal 12 may locally generate the terminal key (e.g., from locally available secret key information).

At step 40, payment card data may be gathered from card 31 by point of sale terminal 12 (e.g., using card reader 14).

At step 42, the payment card data that has been obtained may be encrypted using the terminal key that was generated at step 38.

At step 44, the terminal key may be exchanged with gateway 18. For example, the terminal key may be encrypted using a public key (e.g., an IBE public key) and sent to gateway 18. Gateway 18 can recover the terminal key by using an associated private key (e.g., an IBE private key that was obtained from key server 14). Symmetric key encryption and decryption arrangements may also be used to convey the terminal key from point of sale terminal 12 to gateway 18. If desired, manual delivery techniques, fax arrangements, telephone calls, SSL links or other secure links, or other suitable arrangements may be used to securely exchange the terminal key (or a symmetric key to be used to encrypt and decrypt the terminal key) between the point of sale terminal 12 and processor gateway 18.

At step 46, the payment card data that was encrypted at step 42 may be conveyed to gateway 18 (e.g., in a message).

At step 48, gateway 18 may receive the transmitted encrypted payment card data and may use the terminal key that was exchanged at step 44 to decrypt the encrypted payment card data. The resulting unencrypted payment card information may be processed by gateway 18 accordingly. For example, gateway 18 may examine the payment card information to determine whether the user is authorized to make a particular purchase, gateway 18 may clear a transaction (or group of transactions), gateway 18 may store payment card information in database 22 (e.g., for record-keeping, to process later to monitor payment card transactions for fraudulent activity, etc.).

Any suitable cryptographic functions may be used in encrypting and decrypting data in system 10. For example, symmetric key cryptographic algorithms may be used and/or public key cryptographic algorithms may be used.

These cryptographic algorithms may be used in the encryption and decryption engines of system 10. Examples of suitable cryptographic algorithms include the AES (Advanced Encryption Standard) and DES (data encryption standard) algorithms. To preserve format compatibility with existing database formats, it may sometimes be desirable to use format-preserving encryption (FPE) cryptographic algorithms. When an FPE algorithm is used, encrypted payment card information will have the same format (i.e., a database-compatible format) as unencrypted payment card information, thereby facilitating storage and processing operations. As an example, gateway 18 may use an FPE algorithm when re-encrypting data prior to storage in processor database 22 in storage and processing circuitry 20.

If desired, some of the payment card information may form a randomizing input (sometimes referred to as a "tweak") for an encryption algorithm. This payment card information may, for example, be a plaintext portion of a credit card account number or other payment card data.

Figure 4:
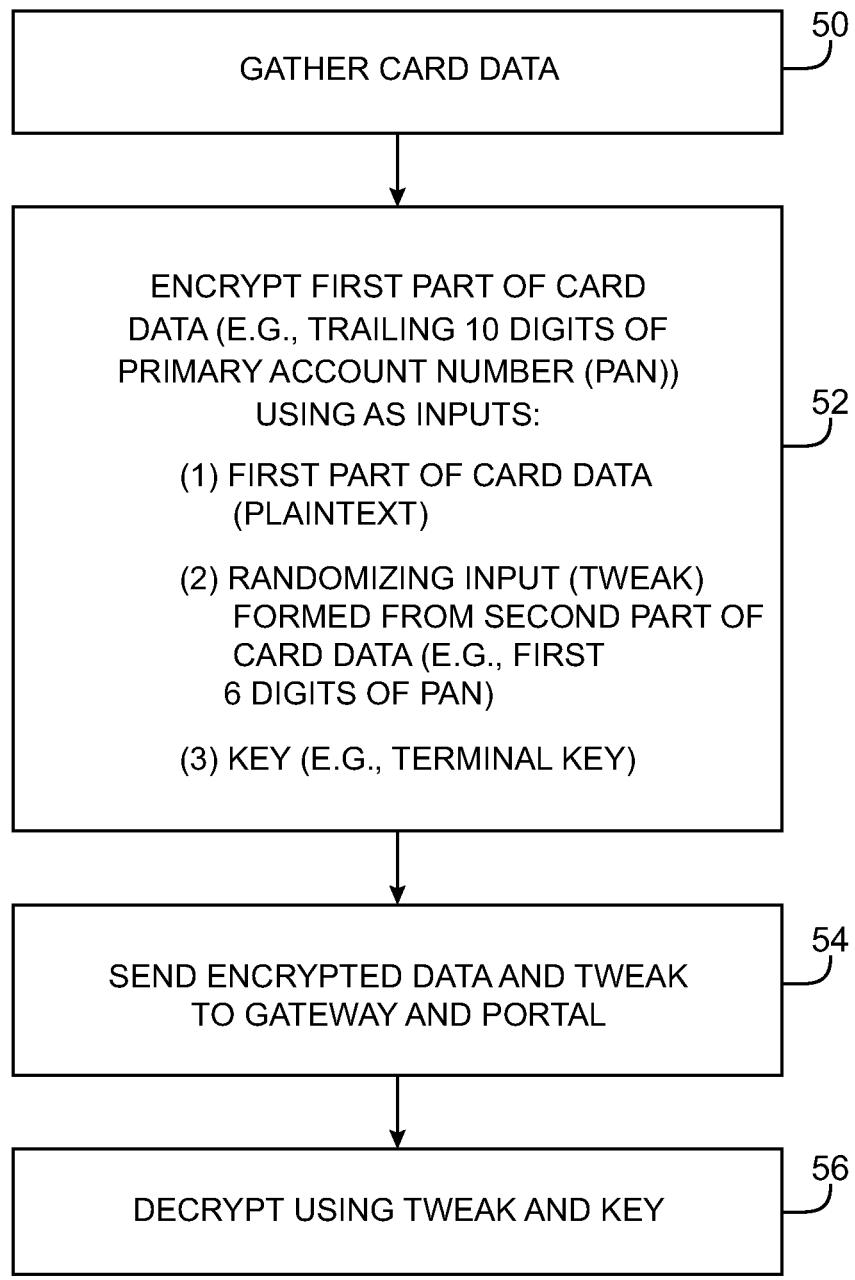
FIG. 4 is a flow chart of illustrative steps involved in performing encryption and decryption operations in accordance with an embodiment of the present invention.

Illustrative steps involved in performing encryption and decryption operations such as these are shown in FIG. 4.

At step 50, point of sale terminal 12 may use card reader 14 to gather payment card information from card 31.

At step 52, point of sale terminal 12 may encrypt a first part of the payment card information using an encryption engine that implements an encryption algorithm. The encryption algorithm may take as inputs: (1) plaintext payment card information, (2) a randomizing input (tweak), and (3) an encryption key. The encryption algorithm may produce ciphertext (i.e., an encrypted version of the plaintext payment card information) as a corresponding output.

With one suitable arrangement, a first part of the payment card information may be encrypted. The first part of the payment card information may, for example, be the last 10 digits of the primary account number (PAN) or any other suitable portion of the payment card data (e.g., all of the PAN except the first six and last four digits).

The last ten digits of the payment card account number may be relatively sensitive, so encryption of this first part of the payment card information enhances security. The tweak may be formed from a second part of the payment card information. As an example, the tweak may be formed from the first six digits of the PAN.

The cryptographic key that is used in encrypting the first part of the payment card information may be a terminal key (e.g., a key that was randomly generated during step 38 of FIG. 3, a key that was obtained from key server 14 of FIG. 1, etc.).

During the encryption operations of step 52, the first part of the payment card information may be encrypted to form ciphertext using the tweak formed from the second part of the payment card information and using the terminal key.

After encrypting the first part of the payment card data in this way, this encrypted payment card data and the tweak may be sent to gateway 18 (step 54).

At step 54, gateway 18 may use a decryption engine implemented on storage and processing circuitry 20 to decrypt the encrypted payment card data (e.g., using the encrypted payment card data, the tweak, and the terminal key as inputs).

Once decrypted, gateway 18 may use the payment card information received from point of sale terminal 12 (e.g., to authorize a transaction, to clear payment, etc.).

It may be desirable to secure data in database 22 by re-encrypting the decrypted payment card information prior to storage in database 22. With this type of arrangement, the payment card data will be secure, even if an attacker gains access to the contents of database 22. Initially, point of sale terminal 12 may encrypt payment card data so that the payment card data will be secure when the payment card data is transmitted across network 17. After gateway 18 receives, decrypts, and processes the payment card information, gateway 18 may re-encrypt the decrypted payment card information. The re-encrypted payment card information may be encrypted using a cryptographic algorithm that is different than the algorithm that is used in encrypting and decrypting the payment card information conveyed between point of sale terminal 12 and gateway 18. For example, gateway 18 may perform encryption with an encryption engine that uses a common key (or set of keys) to encrypt data, regardless of which point of sale terminal originated the payment card data. By using a single key (or set of keys), gateway 18 may simplify the process of encrypting and decrypting data stored in database 22. These keys may, if desired, be periodically refreshed.

To preserve compatibility with existing database infrastructure, it may be desirable to perform re-encryption operations at gateway 18 using a format preserving encryption (FPE) algorithm. As an example, an FPE encryption engine may be used to encrypts alphanumeric payment card strings into encrypted strings of equal (or nearly equal) length using the identical (or nearly identical) sets of characters used in the original strings. As an example, a 12 digit account number might be encrypted to produce a 12 digit ciphertext. As another example, an encryption technique of the type shown in FIG. 4 may be used to encrypt a first part of a payment card PAN while leaving a second part of the payment card PAN (i.e., the first six digits of the PAN) in its original unencrypted state. When the first six digits of the PAN are left unencrypted, gateway 18 may examine these digits to help process the payment card data. The first digit of the PAN may, as an example, indicate the name of the credit card company that is associated with a given payment card. This information may be obtained by gateway 18 from the six unencrypted digits in the PAN. If desired, re-encryption operations at gateway 18 may involve the re-encryption of all but the leading PAN digit.

If desired, different point of sale terminals in system 10 may use different cryptographic algorithms in securing payment card information. With this type of arrangement, encryption algorithm identification information may be used to identify which encryption algorithm was used in encrypting different payment card data items.

Figure 5:
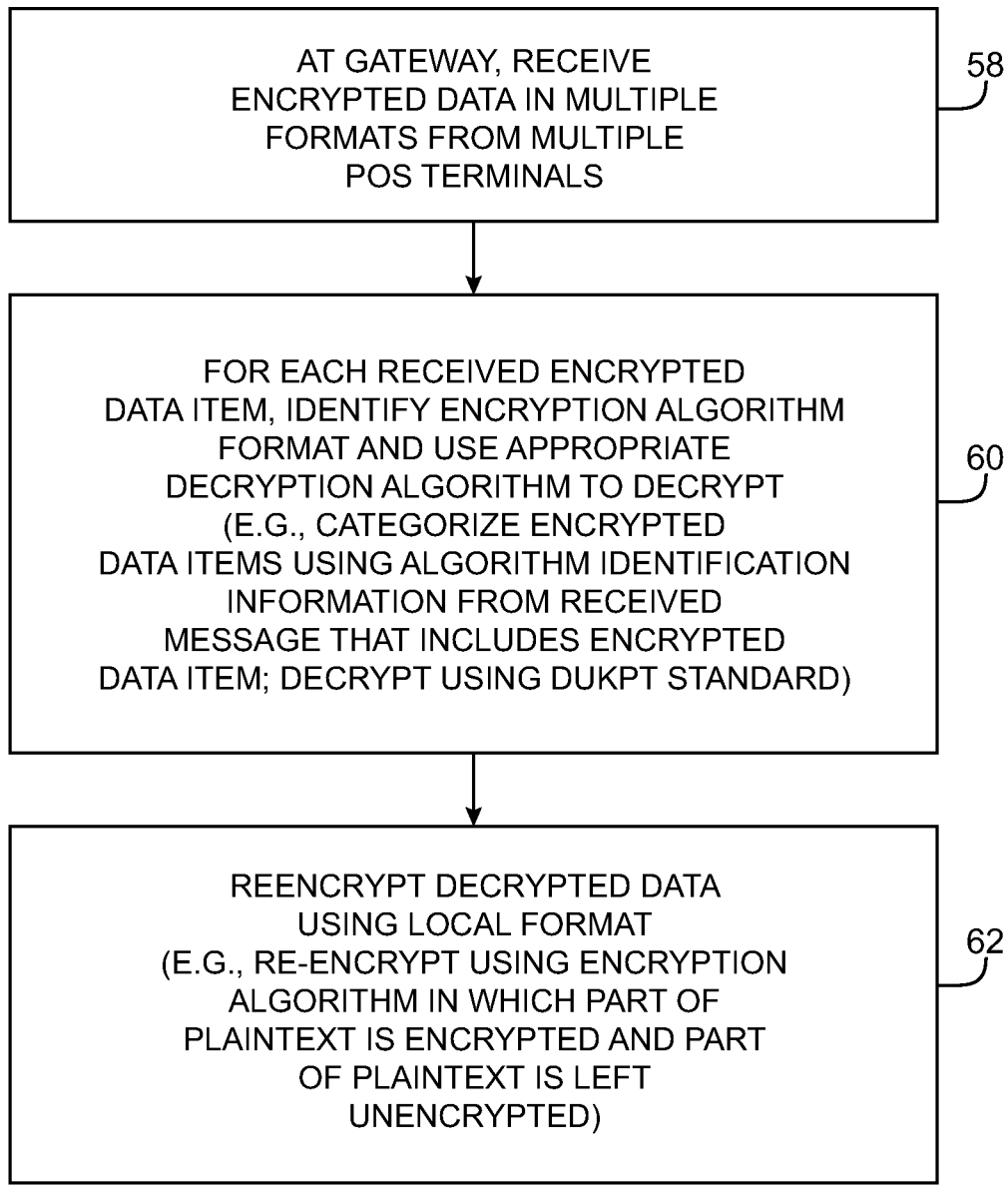
FIG. 5 is a flow chart of illustrative steps involved in processing encrypted data from multiple sources and in re-encrypting data in a common local format in accordance with an embodiment of the present invention.

Illustrative operations involved in using gateway 18 to handle payment card information from multiple point of sale terminals and in re-encrypting data with an encryption engine implemented on storage and processing circuitry 20 for storage in gateway database 22 are shown in FIG. 5.

At step 58, gateway 18 may receive encrypted data in multiple formats (e.g., from multiple corresponding point of sale terminals).

At step 60, each received data item may be categorized by the type of encryption algorithm that was used in encrypting that data item and appropriate decryption operations may be performed. Any suitable scheme may be used in identifying which encryption algorithm was used to encrypt a payment card data item. For example, as each data item is encrypted at a point of sale terminal, the encryption engine at that point of sale terminal may append an associated algorithm identifier to the resulting ciphertext. This algorithm identification information may then be conveyed to gateway 18 with the encrypted payment card information. During the operations of step 60, gateway 18 may categorize each encrypted payment card data item based on its associated algorithm identifier. By using the algorithm identifiers, encrypted data items can be classified according to their encrypting algorithms and appropriate corresponding decryption algorithms may be used to perform decryption.

An example of a cryptographic algorithm that may be used during the encryption and decryption operations of system 10 (e.g., during the decryption operations of step 60) is a cryptographic algorithm that is compliant with the derived unique key per transaction (DUKPT) key management scheme. With this scheme, encryption operations are performed using unique derived keys. Keys are not used more than once, so security is enhanced.

During the operations of step 62, after the decrypted payment card data has been processed as needed by gateway 18, the decrypted data may be re-encrypted. The encryption algorithm that is used by gateway 18 for performing re-encryption may use a format that is associated with gateway 18 and need not be the same as the encryption algorithms that are used at the point of sale terminals in system 10. A typical re-encryption scheme may use, for example, a format preserving encryption algorithm in which part of the payment card data is left unencrypted (e.g., a scheme of the type described in connection with FIG. 4 in which one or more of the leading digits in a payment card primary account number are not encrypted). This type of scheme allows routing operations and other card data processing operation to be performed on the payment card data even when the payment card data is in its re-encrypted form.

Communications between gateway 18 and card brand portal 24 may use secure links (e.g., SSL links), encryption and decryption schemes (e.g., encryption and decryption of the type used to secure payment card data being conveyed between point of sale terminals 12 and gateways 18), or other suitable secure communications scheme.

If desired, gateway 18 may use the cryptographic services of network-based cryptographic service 28. For example, gateway 18 may send encrypted payment card data to service 28 over communications network 17. Service 28 may then perform decryption operations on the encrypted data. Once decrypted, the payment card data can be returned to gateway 18 securely. For example, payment card data can be conveyed securely to gateway 18 by encrypting the data prior to transmission from service 28 to gateway 18 or by conveying the decrypted data from service 28 to gateway 18 over an secure sockets layer (SSL) link or other secure link.

The foregoing is merely illustrative of the principles of this invention and various modifications can be made by those skilled in the art without departing from the scope and spirit of the invention.

What is claimed is:

1. A computer-implemented method comprising:
    receiving, by a transaction processing gateway, plural encrypted data from a plurality of terminals for respective transactions, the plural encrypted data derived by the plurality of terminals by encrypting respective plural data using a plurality of respective encryption algorithms, each encryption algorithm of the plurality of respective encryption algorithms producing respective encrypted data using a different encryption algorithm format;
    identifying, by the transaction processing gateway, each of the different encryption algorithm formats used in encrypting the plural data;
    decrypting, by the transaction processing gateway, the plural encrypted data using a plurality of respective decryption algorithms that respectively correspond to the different encryption algorithm formats, the decrypting of the plural encrypted data producing respective plural decrypted data;
    based on the plural decrypted data, authorizing or declining to authorize the respective transactions wherein the transactions are at respective terminals of the plurality of terminals; and
    encrypting, by the transaction processing gateway, the plural decrypted data that has been decrypted using the plurality of decryption algorithms using a single encryption algorithm.

2. The computer-implemented method of claim 1, wherein encrypting the plural decrypted data comprises encrypting the plural decrypted data using a format-preserving encryption algorithm, wherein a first encrypted data produced from encrypting a first decrypted data using the format-preserving encryption algorithm has a same format as the first decrypted data, the first decrypted data being one of the plural decrypted data.

3. The computer-implemented method of claim 1, wherein encrypting the plural decrypted data comprises:
    encrypting, by the transaction processing gateway, a first portion of a number while leaving a second portion of the number unencrypted; and
    storing, by the transaction processing gateway, the encrypted first portion and the second portion in a database.

4. The computer-implemented method of claim 3, wherein the number comprises a 16-digit primary account number, and wherein the second portion of the number is the first six digits of the 16-digit primary account number.

5. The computer-implemented method of claim 3, wherein the number comprises a primary account number having multiple primary account number digits, and wherein the second portion of the number is the first digit of the primary account number.

6. The computer-implemented method of claim 1, wherein each of the encryption algorithm formats has a different encryption algorithm identifier, the method further comprising:
    receiving, by the transaction processing gateway, the different encryption algorithm identifiers from the plurality of terminals.

7. A transaction gateway comprising:
    a processor; and a non-transitory storage medium comprising instructions executable on the processor to:
receive plural encrypted data from a plurality of terminals for respective transactions, the plural encrypted data derived by the plurality of terminals by encrypting respective plural data using a plurality of respective encryption algorithms, each encryption algorithm of the plurality of respective encryption algorithms producing respective encrypted data using a different encryption algorithm format;
identify each of the different encryption algorithm formats used in encrypting the plural data;
decrypt the plural encrypted data using a plurality of respective decryption algorithms that respectively correspond to the different encryption algorithm formats, the decrypting of the plural encrypted data producing respective plural decrypted data;
based on the plural decrypted data, authorize or decline to authorize the respective transactions wherein the transactions are at respective terminals of the plurality of terminals; and
encrypt the plural decrypted data that has been decrypted using the plurality of decryption algorithms using a single encryption algorithm.

8. The transaction gateway of claim 7, wherein the encrypting of the plural decrypted data comprises encrypting the plural decrypted data using a format-preserving encryption algorithm, wherein a first encrypted data produced from encrypting a first decrypted data using the format-preserving encryption algorithm has a same format as the first decrypted data, the first decrypted data being one of the plural decrypted data.

9. The transaction gateway of claim 7, wherein the encrypting of the plural decrypted data comprises:
encrypting a first portion of a number while leaving a second portion of the number unencrypted; and
storing the encrypted first portion and the second portion in a database.

10. The transaction gateway of claim 9, wherein the number comprises a 16-digit primary account number, and wherein the second portion of the number is the first six digits of the 16-digit primary account number.

11. The transaction gateway of claim 9, wherein the number comprises a primary account number having multiple primary account number digits, and wherein the second portion of the number is the first digit of the primary account number.

12. The transaction gateway of claim 7, wherein each of the encryption algorithm formats has a different encryption algorithm identifier, and wherein the instructions are executable on the processor to further:
receive the different encryption algorithm identifiers from the plurality of terminals.

13. A non-transitory storage medium storing instructions that upon execution cause a transaction gateway to:
receive plural encrypted data from a plurality of terminals for respective transactions, the plural encrypted data derived by the plurality of terminals by encrypting respective plural data using a plurality of respective encryption algorithms, each encryption algorithm of the plurality of respective encryption algorithms producing respective encrypted data using a different encryption algorithm format;
identify each of the different encryption algorithm formats used in encrypting the plural data;
decrypt the plural encrypted data using a plurality of respective decryption algorithms that respectively correspond to the different encryption algorithm formats, the decrypting of the plural encrypted producing respective plural decrypted data;
based on the plural decrypted data, authorize or decline to authorize the respective transactions at respective terminals wherein the transactions are of the plurality of terminals; and
encrypt the plural decrypted data that has been decrypted using the plurality of decryption algorithms using a single encryption algorithm.

14. The non-transitory storage medium of claim 13, wherein the encrypting of the plural decrypted data comprises encrypting the plural decrypted data using a format-preserving encryption algorithm, wherein a first encrypted data produced from encrypting a first decrypted data using the format-preserving encryption algorithm has a same format as the first decrypted data, the first decrypted data being one of the plural decrypted data.

15. The non-transitory storage medium of claim 13, wherein the encrypting of the plural decrypted data comprises:
encrypting a first portion of a number while leaving a second portion of the number unencrypted; and
storing the encrypted first portion and the second portion in a database.

16. The non-transitory storage medium of claim 15, wherein the number comprises a 16-digit primary account number, and wherein the second portion of the number is the first six digits of the 16-digit primary account number.

17. The non-transitory storage medium of claim 13, wherein each of the encryption algorithm formats has a different encryption algorithm identifier, and wherein the instructions upon execution cause the transaction gateway to further:
receive the different encryption algorithm identifiers from the plurality of terminals.

\* \* \* \* \*